United States Patent
Kern et al.

(10) Patent No.: US 10,049,208 B2
(45) Date of Patent: Aug. 14, 2018

(54) INTRUSION ASSESSMENT SYSTEM

(71) Applicant: Bank of America Corporation, Charlotte, NC (US)

(72) Inventors: Daniel C. Kern, Charlotte, NC (US); Adam Z. Sun, New York City, NY (US)

(73) Assignee: Bank of America Corporation, Charlotte, NC (US)

( * ) Notice: Subject to any disclaimer, the term of this patent is extended or adjusted under 35 U.S.C. 154(b) by 62 days.

(21) Appl. No.: 14/958,578

(22) Filed: Dec. 3, 2015

(65) Prior Publication Data

US 2017/0161494 A1 Jun. 8, 2017

(51) Int. Cl.
*G06F 21/55* (2013.01)
*H04L 29/06* (2006.01)

(52) U.S. Cl.
CPC .......... *G06F 21/552* (2013.01); *H04L 63/145* (2013.01); *H04L 63/1425* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,046,363 B2 | 10/2011 | Cha et al. | |
| 8,065,145 B2 | 11/2011 | Okamoto et al. | |
| 8,200,695 B2 | 6/2012 | Cha et al. | |
| 8,645,389 B2 * | 2/2014 | Oliver | G06F 17/30675 707/723 |
| 9,009,131 B1 * | 4/2015 | Kaufmann | G06F 17/3069 707/706 |
| 9,122,747 B2 * | 9/2015 | Inagaki | G06F 17/3069 |
| 9,268,844 B1 * | 2/2016 | Kadarkarai | G06F 17/30705 |
| 9,529,860 B2 * | 12/2016 | Kern | G06F 17/30554 |
| 9,703,863 B2 * | 7/2017 | Barsony | G06F 17/30713 |
| 2005/0132197 A1 * | 6/2005 | Medlar | H04L 51/12 713/176 |
| 2012/0124038 A1 * | 5/2012 | Buchheit | G06F 17/30905 707/723 |
| 2012/0167164 A1 * | 6/2012 | Burgess | G06F 21/00 726/1 |
| 2017/0163678 A1 * | 6/2017 | Kern | H04L 63/1441 |

* cited by examiner

*Primary Examiner* — Michael R Vaughan
(74) *Attorney, Agent, or Firm* — Michael A. Springs

(57) ABSTRACT

An intrusion assessment apparatus includes a memory and a processor. The memory stores first and second records and first, second, and third keywords. The processor determines a number of occurrences of the first, second, and third keywords in the first and second records and assigns the first record to a first cluster and the second record to a second cluster. The processor also determines a per-record average number of occurrences of the keywords in a plurality of records assigned to the first cluster and in a plurality of records assigned to the second cluster and receives a search request indicating the keywords and an emphasis value for each keyword. The processor also determines that the first cluster should be returned in response to the request and transmits, based on that determination, the first record.

18 Claims, 4 Drawing Sheets

INTRUSION ASSESSMENT SYSTEM

TECHNICAL FIELD

This disclosure relates generally to a system for assessing intrusions.

BACKGROUND

Intrusions are an indicator of the security of a network and/or computer system. For example, the occurrence of intrusions may indicate that certain devices on a network have been compromised by malware, hacks, viruses, etc. Therefore, assessing intrusions is one way to maintain and/or improve the security of a network.

SUMMARY OF THE DISCLOSURE

According to one embodiment, an intrusion assessment apparatus includes a memory and a processor. The memory stores first and second records and first, second, and third keywords. The processor determines a number of occurrences of the first, second, and third keywords in the first and second records. Based on the number of occurrences of the first, second, and third keywords in the first and second records, the processor assigns the first record to a first cluster and the second record to a second cluster. The processor also determines a per-record average number of occurrences of the first, second, and third keywords in a plurality of records assigned to the first cluster and in a plurality of records assigned to the second cluster and receives a search request indicating the first, second, and third keywords and an emphasis value for each of the first, second, and third keywords. The processor also determines, based on the per-record average numbers of occurrences of the first, second, and third keywords in the plurality of records assigned to the first cluster and in the plurality of records assigned to the second cluster, that the first cluster should be returned in response to the request and transmits, based on that determination, the first record.

According to another embodiment, a method includes storing first and second records and first, second, and third keywords. The method also includes determining a number of occurrences of the first, second, and third keywords in the first and second records. Then based on the number of occurrences of the first, second, and third keywords in the first and second records, assigning the first record to a first cluster and the second record to a second cluster. The method further includes determining a per-record average number of occurrences of the first, second, and third keywords in a plurality of records assigned to the first cluster and in a plurality of records assigned to the second cluster and receiving a search request indicating the first, second, and third keywords and an emphasis value for each of the first, second, and third keywords. The method also includes determining, based on the per-record average numbers of occurrences of the first, second, and third keywords in the plurality of records assigned to the first cluster and in the plurality of records assigned to the second cluster, that the first cluster should be returned in response to the request and transmitting, based on that determination, the first record.

According to another embodiment, one or more computer-readable non-transitory storage media embodies software that is operable when executed to store first and second records and first, second, and third keywords. The software is further operable to determine a number of occurrences of the first, second, and third keywords in the first and second records. Then, based on the number of occurrences of the first, second, and third keywords in the first and second records, assign the first record to a first cluster and the second record to a second cluster. The software is also operable to determine a per-record average number of occurrences of the first, second, and third keywords in a plurality of records assigned to the first cluster and in a plurality of records assigned to the second cluster and to receive a search request indicating the first, second, and third keywords and an emphasis value for each of the first, second, and third keywords. The software is further operable to determine, based on the per-record average numbers of occurrences of the first, second, and third keywords in the plurality of records assigned to the first cluster and in the plurality of records assigned to the second cluster, that the first cluster should be returned in response to the request and transmit, based on that determination, the first record.

Certain embodiments may provide one or more technical advantages. For example, an embodiment improves network security by assessing intrusions that have occurred. By assessing intrusions, the system allows a user to develop procedures and processes to prevent future intrusions from occurring. As another example, an embodiment reduces the amount of intrusions by assessing prior intrusions. By assessing prior intrusions, one can understand the source and/or cause behind the intrusions. Through this understanding, safeguards (e.g. firewalls, antiviruses, anti-malware, etc.) can be implemented to prevent similar intrusions in the future. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
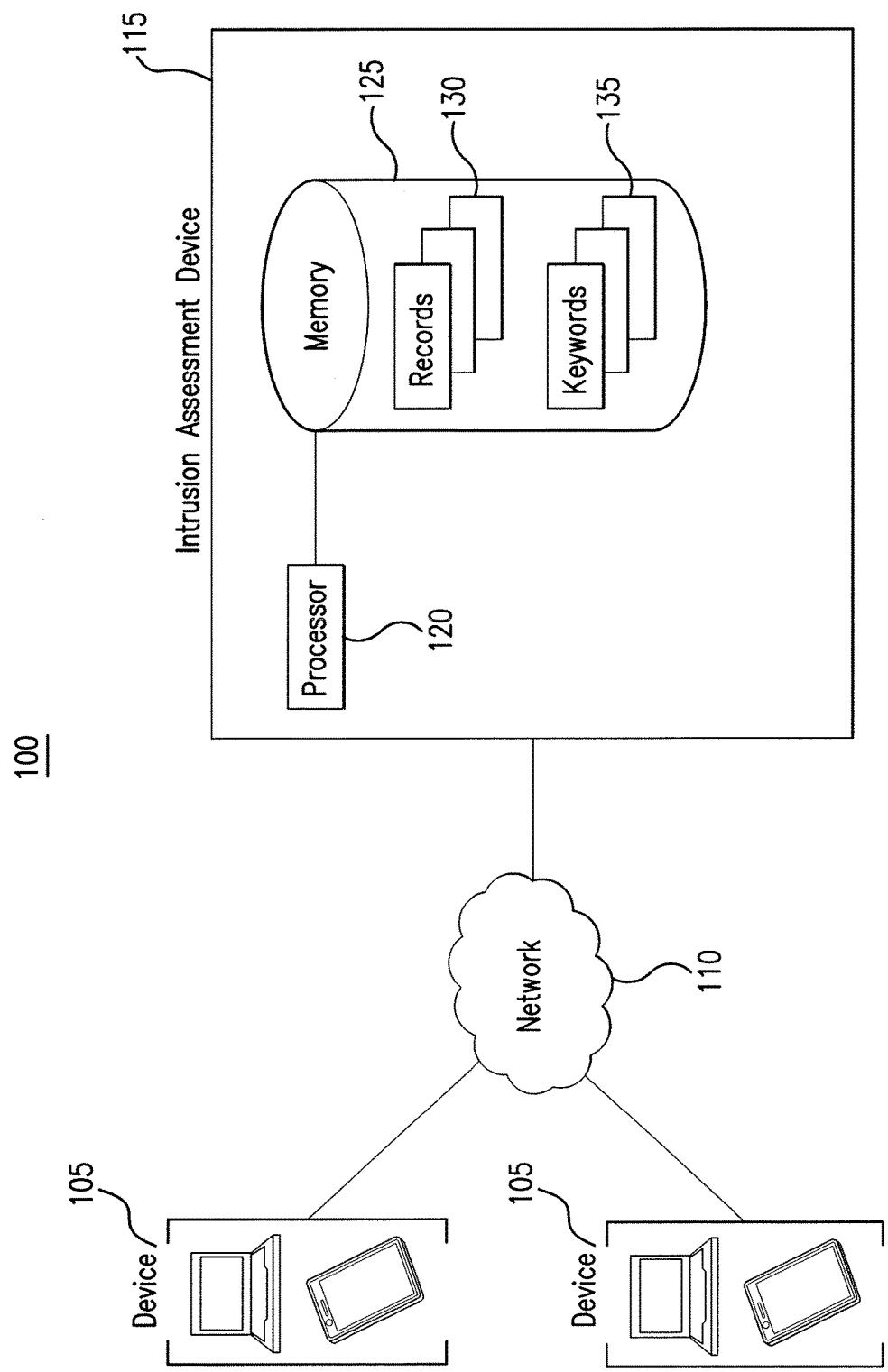
FIG. 1 illustrates a system for assessing intrusions.

Embodiments of the present disclosure and its advantages are best understood by referring to FIGS. 1 through 4 of the drawings, like numerals being used for like and corresponding parts of the various drawings.

The security of a computer network is important to the functioning of the network. If a network is not secure, then any number of types of intrusions and/or malware may jeopardize the core functionality of the network or any user device on the network. Therefore, maintaining the security of the network is a problem inherent to computer networks such as the Internet and is important to the functioning of the network itself.

It is important to assess the security of the network in order to maintain the security of the network. One way to assess the security of the network is to evaluate intrusions that have occurred over the network. The amount of intrusions that occur over the network indicates the health and security of the network. For example, if there is a high amount of intrusions occurring over the network, then several users and/or accounts associated with the network may have been compromised and/or stolen. As another example, a high amount of intrusions occurring over the network may indicate that certain procedures and measures implemented to prevent network intrusions may be failing. Therefore, assessing intrusions is important to maintaining the security and health of the network.

One way to assess intrusions occurring over the network is to review records such as, for example, emails, letters, documents, etc. that indicate, describe, and/or are examples of intrusions. However, as a network grows larger and as the network operates for a longer period of time, the number of records to evaluate to assess intrusions may increase to an unmanageable amount. Furthermore, the number of records that may not pertain to intrusions but have nonetheless been flagged as such may increase. As a result, it becomes more difficult to assess intrusions over the network.

This disclosure contemplates a system for assessing intrusions. The system evaluates records based on certain selected keywords. The keywords may pertain to intrusions. For example, the keywords may be "hack," "compromise," "scam," and/or "password." The system counts the number of occurrences of these keywords in the records. Then the system assigns the records to certain clusters based on these determined number of occurrences. For example, two records that include the word "hack" five times may be clustered together and two records that include the word "scam" zero times may be assigned to a different cluster.

After the records have been assigned to particular clusters, the system can perform searches based on the clusters rather than based on the records. For example, the system can calculate a center point for each cluster by calculating the average number of occurrences of each keyword for each record assigned to that cluster. When the system receives a search request, the system evaluates the keywords present in the search request and determines the cluster that has a center point closest to the indicated keywords in the search request. The system then returns the records assigned to that determined cluster. As a result, analysis may be performed on the returned records. In this manner the system makes it easier to assess intrusions over the network, which improves the security of the network.

Figure 2:
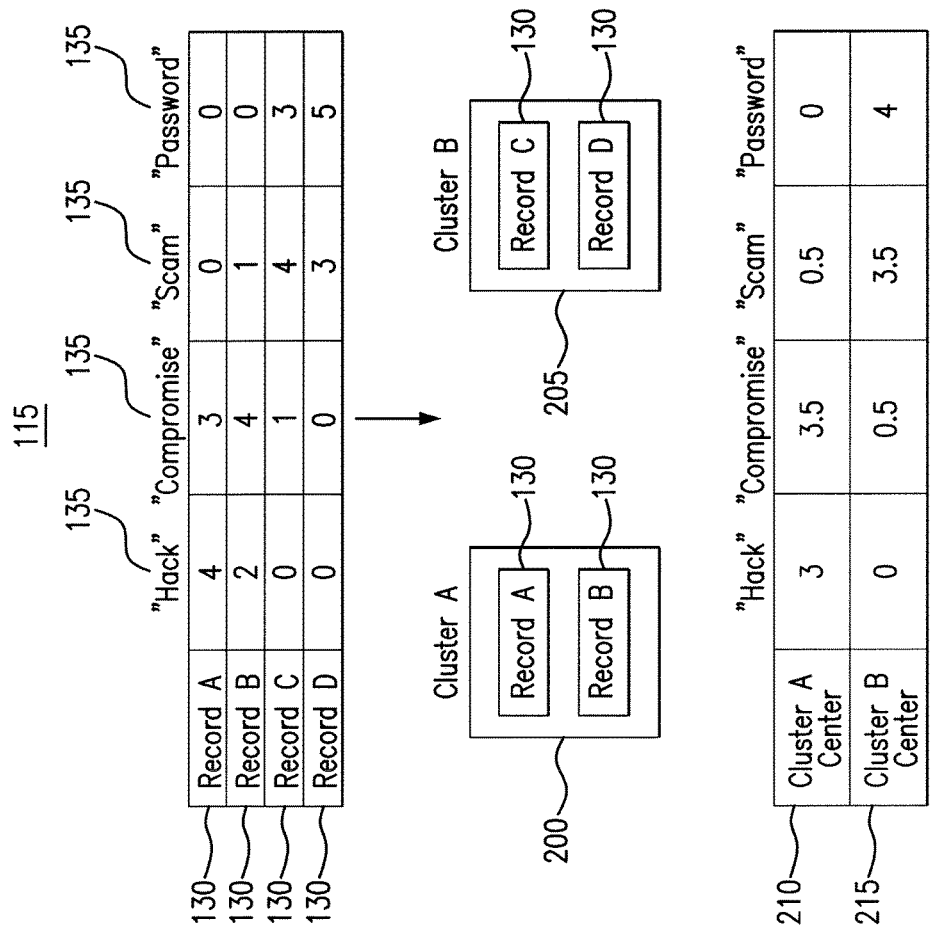
FIG. 2 illustrates the intrusion assessment device of FIG. 1 assessing intrusions.
Figure 3:
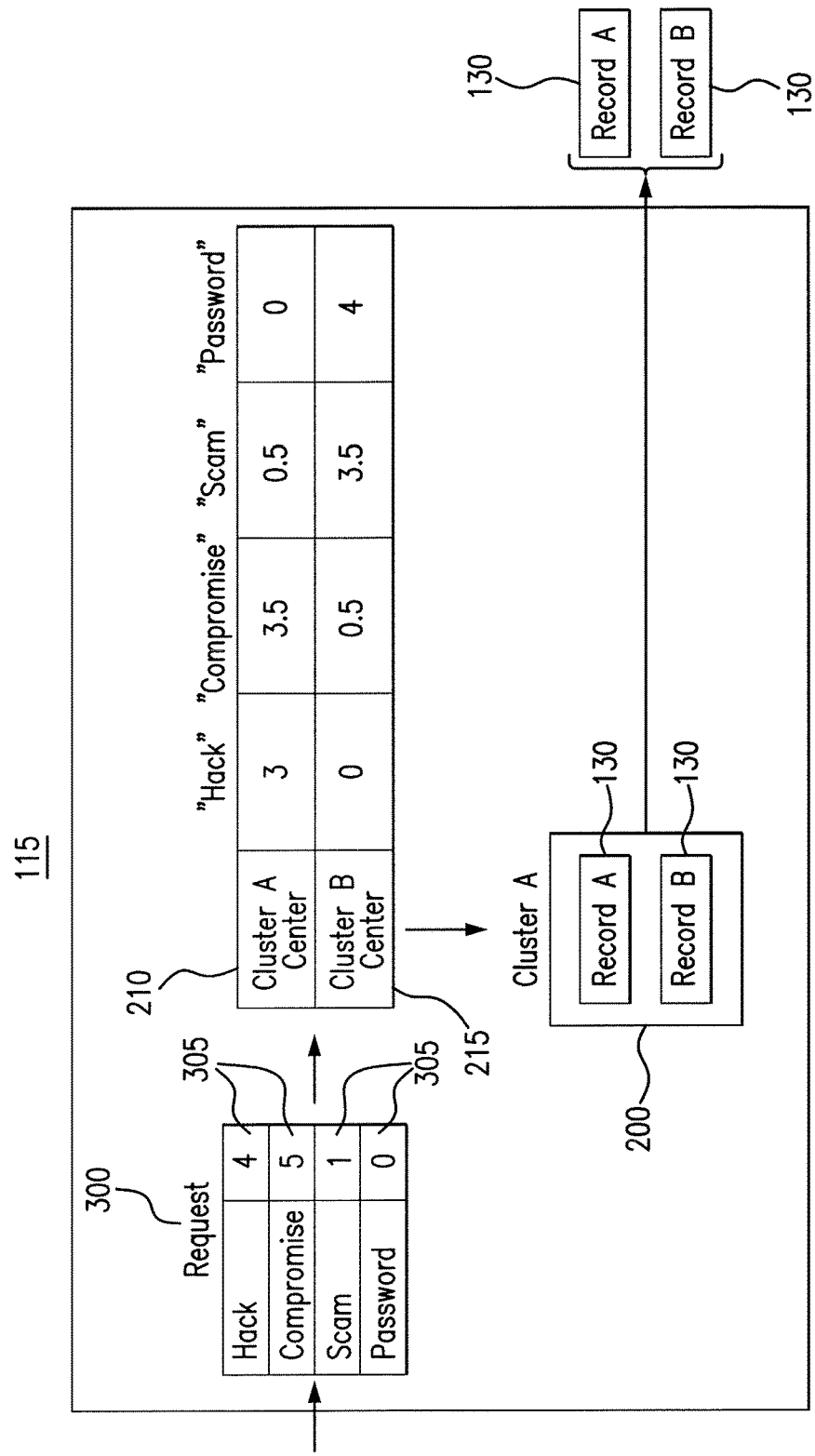
FIG. 3 illustrates the intrusion assessment device of FIG. 1 assessing intrusions.
Figure 4:
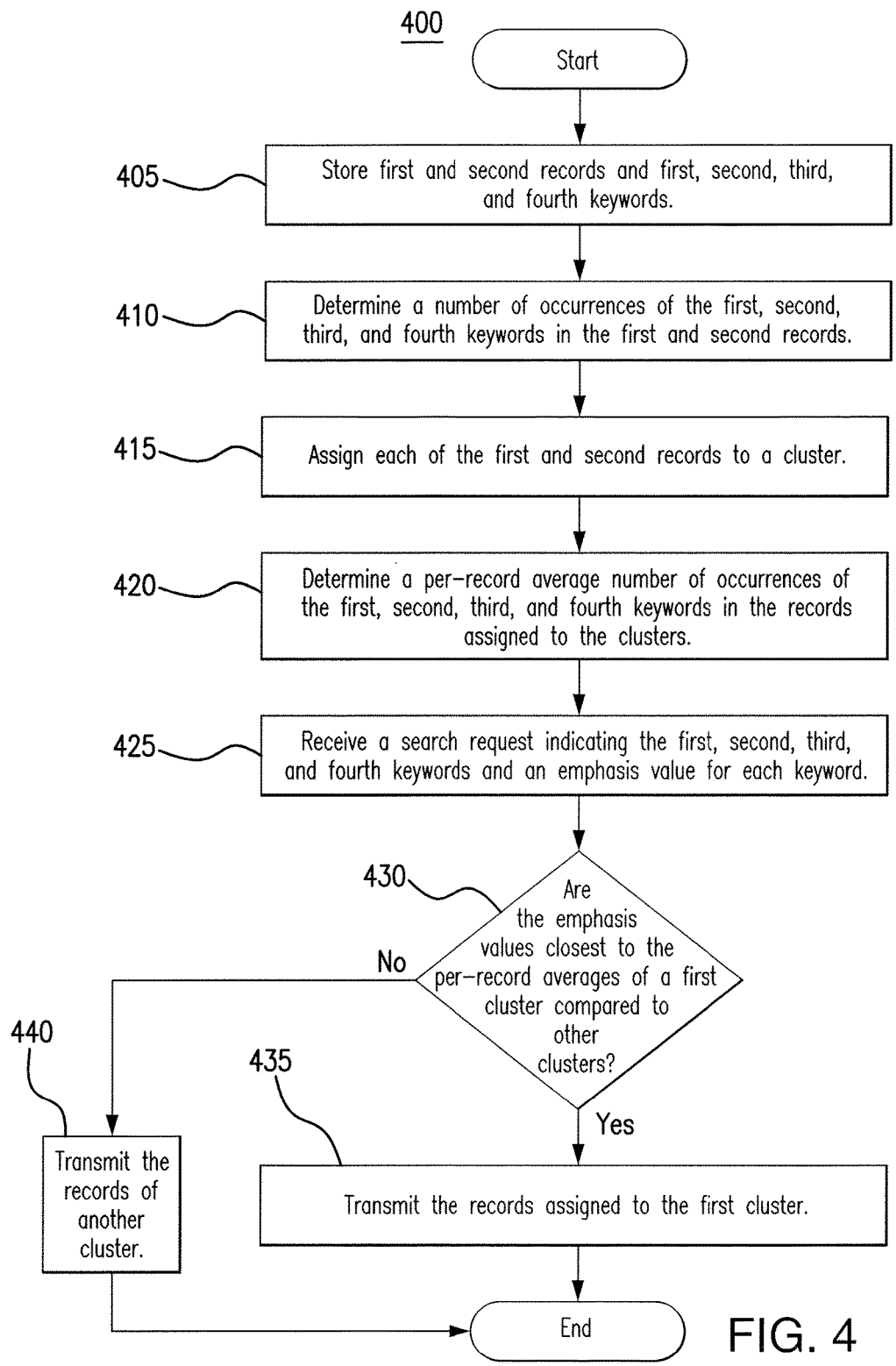
FIG. 4 is a flowchart illustrating a method for assessing intrusions using the system of FIG. 1.

The system will be described in more detail using FIGS. 1 through 4. FIG. 1 presents a general overview of the system. FIGS. 2 and 3 describe the operation of the system in more detail. FIG. 4 is a flowchart illustrating the operation of the system.

FIG. 1 illustrates a system 100 for assessing intrusions. As illustrated in FIG. 1, system 100 includes one or more devices 105, a network 110, and an intrusion assessment device 115. In certain embodiments, system 100 is used to assess intrusions over network 110 to maintain and/or improve the security of network 110.

Device 105 is used to administer and/or control the operation of system 100. This disclosure contemplates system 100 including any number of devices 105. Device 105 is any device capable of communicating over network 110. Device 105 may execute software applications. During execution the application may have device 105 communicate with other components of system 100.

This disclosure contemplates device 105 being any appropriate device that can communicate over network 110. For example, device 105 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 105 may also include a user interface, such as a display, a microphone, keypad, or other appropriate terminal equipment usable by a user. In some embodiments, an application executed by device 105 may perform the functions described herein.

Network 110 facilitates communication between and amongst the various components of system 100. This disclosure contemplates network 110 being any suitable network operable to facilitate communication between the components of system 100. Network 110 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Intrusion assessment device 115 is used to assess intrusions over network 110. As illustrated in FIG. 1, intrusion assessment device 115 includes a processor 120 and a memory 125. This disclosure contemplates processor 120 and memory 125 being configured to perform any of the functions of intrusion assessment device 115 described herein. In particular embodiments, by using intrusion assessment device 115, intrusions over network 110 are reduced. In some embodiments, by using intrusion assessment device 115, the security of network 110 is maintained and/or improved.

Processor 120 is any electronic circuitry, including, but not limited to microprocessors, application specific integrated circuits (ASIC), application specific instruction set processor (ASIP), and/or state machines, that communicatively couples to memory 125 and controls the operation of intrusion assessment device 115. Processor 120 may be 8-bit, 16-bit, 32-bit, 64-bit or of any other suitable architecture. Processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 120 may include other hardware and software that operates to control and process information. Processor 120 executes software stored on memory 125 to perform any of the functions described herein. Processor 120 controls the operation and administration of intrusion assessment device 115 by processing information received from network 110, device(s) 105, and memory 125. Processor 120 may be a programmable logic device, a microcontroller, a microprocessor, any suitable processing device, or any suitable combination of the preceding. Processor 120 is not limited to a single processing device and may encompass multiple processing devices.

Memory 125 stores, either permanently or temporarily, data, operational software, or other information for processor 120. Memory 125 includes any one or a combination of volatile or non-volatile local or remote devices suitable for storing information. For example, memory 125 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 125, a disk, a CD, or a flash drive. In particular embodiments, the software may include an application executable by processor 120 to perform one or more of the functions described herein.

Intrusion assessment device 115 stores records 130 and keywords 135. Records 130 may indicate various actions and activities that have occurred over network 110. For example, records 130 may be emails, letters, documents, and any other suitable file. This disclosure contemplates records 130 being generated by one or more devices 105. Each record 130 may pertain to a particular topic. Intrusion assessment device 115 may categorize each record 130 based on topics using keywords 135.

As an example, device 105 may receive an email that describes an intrusion. In response, device 105 may forward that email to intrusion assessment device 115. Intrusion assessment device 115 may then store that email as a record 130. As another example, device 105 may open a document that is suspected of describing an intrusion. Device 105 may forward that document to intrusion assessment device 115. Intrusion assessment device 115 may store that document as a record 130.

As the number of devices 105 on network 110 grows and as network 110 operates for a longer period of time, the number of records 130 stored in intrusion assessment device 115 may increase to an unmanageable amount. As a result, it may become more difficult to assess intrusions over network 110. This difficulty may result in the security of network 110 being threatened. Intrusion assessment device 115 is used to address this difficulty in certain embodiments. For example, intrusion assessment device 115 uses keywords 135 to categorize and search records 130. In this manner, records 130 that are relevant to particular analyses may be returned.

Keywords 135 are used to categorize and/or search records 130. This disclosure contemplates keywords 135 including any appropriate keywords 135 for performing any suitable analysis. In particular embodiments, keywords 135 include keyphrases. Each keyphrase may include multiple words that can be treated collectively as a keyword 135.

Intrusion assessment device 115 uses keywords 135 to categorize records 130. As an example, intrusion assessment device 115 may use the keywords "hack," "compromise," "scam," and "password" to assess intrusions over network 110. Intrusion assessment device 115 may use these keywords 135 to organize and/or categorize records 130. For example, intrusion assessment device 115 may count the occurrence of each of these keywords in every record 130. Then, based on the number of occurrences of these keywords, intrusion assessment device 115 may categorize each record 130 as an intrusion record or a non-intrusion record. Intrusion assessment device 115 may create a cluster for intrusion records and another cluster for non-intrusion records. Then, intrusion assessment device 115 may assign each record 130 into the intrusion cluster or the non-intrusion cluster based on the number of occurrences of these keywords in each record 130.

Intrusion assessment device 115 may use keywords 135 to search records 130. For example, intrusion assessment device 115 may receive a search request from device 105. The search request may indicate particular keywords 135 that are to be searched. Intrusion assessment device 115 may then determine an appropriate cluster based on the keywords in the search request. Intrusion assessment device 115 may then return the records 130 assigned to that cluster.

After records 130 are returned, these records 130 may be analyzed to determine the amount and/or impact of intrusion over network 110. Based on that analysis, certain procedures and/or processes (e.g., firewalls, filters, antiviruses, anti-malware, etc.) may be implemented to reduce intrusion over network 110, which may improve and/or maintain the security of network 110. The operation of intrusion assessment device 115 will be described in more detail using FIGS. 2 through 4.

Modifications, additions, or omissions may be made to system 100 without departing from the scope of the invention. For example, intrusion assessment device 115 may be a distributed device. As another example, the components of system 100 may be integrated or separated. For example, intrusion assessment device 115 may be incorporated into any of one or more devices 105. Furthermore, system 100 may include any number of devices 105.

FIG. 2 illustrates various aspects of the intrusion assessment device 115 of FIG. 1 assessing intrusion. As illustrated in FIG. 2, intrusion assessment device 115 determines the number of occurrences of certain keywords 135 in the various records 130 and then assigns each record 130 to a cluster. Intrusion assessment device 115 also determines a center point for each cluster. By assigning each record 130 to a cluster, intrusion assessment device 115 may make it easier to assess the records 130 for intrusions thereby reducing the amount of intrusions over network 110 and/or improving the security of network 110.

Intrusion assessment device 115 may determine the number of occurrences of certain keywords 135 in records 130. In the illustrated example of FIG. 2, intrusion assessment device 115 examines four records 130, record A, record B, record C, and record D. Intrusion assessment device 115 may examine the words in each record 130 and analyze whether those words include certain keywords 135. In the illustrated example of FIG. 2, the keywords 135 include "hack," "compromise," "scam," and "password." Intrusion assessment device 115 may track the number of occurrences of each keyword 135 in each record 130. For example, record A includes the word "hack" four times, the word "compromise" three times, the word "scam" zero times, and the word "password" zero times. Record B includes the word "hack" two times, the word "compromise" four times, the word "scam" one time, and the word "password" zero times. Record C includes the word "hack" zero times, the word "compromise" one time, the word "scam" four times, and the word "password" three times. Record D includes the word "hack" zero times, the word "compromise" zero times, the word "scam" three times, and the word "password" five times. This disclosure contemplates intrusion assessment device 115 assessing intrusions using any number of records 130. Furthermore, this disclosure contemplates intrusion assessment device 115 determining the number of occurrences of any number of suitable keywords 135. It is understood that keywords 135 may be any word.

Intrusion assessment device 115 assigns each record 130 to a cluster based on the determined number of occurrences of keywords 135 in those records 130. In the illustrated example of FIG. 2, intrusion assessment device 115 assigns records A, B, C, and D to two clusters, cluster A 200 and cluster B 205. Record A and record B have been assigned to cluster A 200 and record C and record D have been assigned to cluster B 205. Record A and record B are clustered together because the number of occurrences of the words "hack," "compromise," "scam," and "password" are similar in records A and B. Record C and record D are clustered together because the occurrences of the words "hack," "compromise," "scam," and "password" are similar in records C and D. This disclosure contemplates intrusion assessment device 115 assigning records 130 to any number of clusters. The number of clusters may be determined using any appropriate method such as, for example, K-means clustering.

Intrusion assessment device 115 may determine a center point for each cluster. In the illustrated example of FIG. 2, intrusion assessment device 115 determines a cluster A center 210 and a cluster B center 215. Intrusion assessment device 115 may determine the centers based on the per-record average number of occurrences of each keyword 135 in the records 130 assigned to the particular cluster. In the example of FIG. 2, cluster A center 210 is 3, 3.5, 0.5 and 0. This is because the average number of times that the word "hack" appears in the records 130 assigned to cluster A 200 is 3, the average number of times the word "compromise" appears in the records 130 assigned to cluster A 200 is 3.5, and so on. Furthermore, cluster B center 215 is 0, 0.5, 3.5, and 4. Intrusion assessment device 115 may use cluster A center 210 and cluster B center 215 to facilitate searching of records 130.

In particular embodiments, by assigning records 130 to clusters, intrusion assessment device 115 may make it easier to assess intrusions over network 110. In this manner, the security of network 110 may be improved and/or maintained.

FIG. 3 illustrates various aspects of the intrusion assessment device 115 of FIG. 1 assessing intrusions. As illustrated in FIG. 3, intrusion assessment device 115 allows for searching of records 130 using clusters of records 130. In particular embodiments, by allowing such searching, intrusion assessment device 115 makes it easier to assess records 130 and to reduce intrusions over network 110.

Intrusion assessment device 115 receives a request 300. Request 300 may be a search request that indicates particular keywords 135. In the illustrated example of FIG. 3, request 300 indicates the words "hack," "compromise," "scam," and "password." Request 300 may also indicate an emphasis value 305 for each keyword 135. In the example of FIG. 3, "hack" has an emphasis value 305 of four, "compromise" has an emphasis value 305 of five, "scam" has an emphasis value 305 of one, and "password" has an emphasis value 305 of zero.

Intrusion assessment device 115 may search clusters based on request 300. For example, intrusion assessment device 115 may compare the emphasis values 305 in request 300 with the corresponding values of the cluster center points. Emphasis values 305 may be supplied by a user and may indicate the emphasis to be placed on particular keywords 135 during a search. In the illustrated example of FIG. 3, intrusion assessment device 115 compares the emphasis values 305 in request 300 with the corresponding values in cluster A center 210 and cluster B center 215. Intrusion assessment device 115 may then determine which cluster is most appropriate given the emphasis values 305 in request 300.

In particular embodiments, intrusion assessment device 115 determines the most appropriate cluster using the root mean square between the emphasis values 305 of request 300 and the corresponding values of the clusters center point. In the illustrated example of FIG. 3, intrusion assessment device 115 determines a difference between the emphasis value 305 for "hack" and the center point value for "hack" in cluster A center 210 and cluster B center 215. These differences are one and four respectively. Then intrusion assessment device 115 determines the difference between the emphasis value 305 for "compromise" and the center point value for "compromise" in cluster A center 210 and cluster B center 215. These values are 1.5 and 4.5 respectively. Then intrusion assessment device 115 determines the difference between the emphasis value 305 for "scam" and the center point value for "scam" in cluster A center 210 and cluster B center 215. These values are 0.5 and −2.5 respectively. Then intrusion assessment device 115 determines the difference between the emphasis value 305 for "password" and the center point value for "password" in cluster A center 210 and cluster B center 215. These values are zero and −4 respectively.

Intrusion assessment device 115 then calculates the root mean square of these differences for cluster A center 210 and cluster B center 215. For a cluster A center 210, the root mean square is 1.87 and the root mean square of the differences for cluster B center 215 is 7.64. Based on these root mean square values, intrusion assessment device 115 determines the most appropriate cluster in the illustrated example of FIG. 3. Because the root mean square for cluster A 200 is less than the root mean square for a cluster B 205, intrusion assessment device 115 returns cluster A 200. After determining that cluster A 200 is the most appropriate cluster based on the emphasis values 305 in request 300, intrusion assessment device 115 returns the records 130 in cluster A 200. In the illustrated example of FIG. 3, intrusion assessment device 115 returns record A and record B.

Intrusion assessment device 115 may then communicate record A and record B to a device 105. The device 105 may be the device 105 that issued request 300. A user of device 105 may then analyze record A and record B to assess intrusions over a network 110. In particular embodiments, intrusion assessment device 115 communicates an alert indicating records A and B. The alert notifies a user of device 105 that records 130 indicating intrusions have been returned.

In particular embodiments, intrusion assessment device 115 determines a relevance value for each returned record 130. For example, intrusion assessment device 115 determines a relevance value for record A by calculating the differences between the number of occurrences of keywords 135 in record A and the center point values for cluster A 200. In the illustrated examples of FIGS. 2 3, these differences are 1 for "hack," 0.5 for "compromise," 0.5 for "scam," and 0 for "password." Based on these differences, intrusion assessment device 115 calculates a relevance value. For example, intrusion assessment device 115 calculates the root mean square of these differences. In the example of record A, the root mean square is 1.22. Intrusion assessment device 115 then determines a relevance value for record A based on that root mean square. In certain embodiments, the lower of the root mean square value, the higher the relevance value that is given to a particular record 130.

In particular embodiments, by searching clusters based on their center point values and returning the records assigned to a cluster, intrusion assessment device 115 makes it easier to assess intrusions over network 110. In this manner, the amount of intrusions over network 110 is reduced. Furthermore, the security of network 110 is improved and/or maintained.

FIG. 4 is a flowchart illustrating a method 400 for assessing intrusions using the system 100 of FIG. 1. In particular embodiments, intrusion assessment device 115 performs method 400. By performing method 400, intrusion assessment device 115 may make it easier to assess intrusions over network 110 and to maintain and/or improve the security of network 110.

Intrusion assessment device 115 begins by storing first and second records and first, second, third, and fourth keywords in step 405. In step 410, intrusion assessment device 115 determines the number of occurrences of the first, second, third, and fourth keywords in the first and second records. Then in step 415, intrusion assessment device 115 assigns each of the first and second records to a cluster. Intrusion assessment device 115 may make these assignments based on the number of occurrences of the first, second, third, and fourth keywords in the first and second records. In the illustrated examples of FIGS. 2 and 3, intrusion assessment device 115 assigns records to two clusters.

In step 420, intrusion assessment device 115 determines a per-record average number of occurrences of the first, second, third, and fourth keywords in the records assigned to the clusters. In step 425, intrusion assessment device 115 receives a search request indicating the first, second, third, and fourth keywords and the emphasis value for each keyword. Based on those emphasis values, intrusion assessment device 115 may determine a cluster that is most appropriate to use to respond to the search request. In step 430, intrusion assessment device 115 determines whether the emphasis value is closest to the per record averages of a first cluster compared to other clusters. If so, then intrusion assessment device 115 proceeds to step 435 to transmit the records assigned to the first cluster. If not, then intrusion assessment device 115 proceeds to step 440 to transmit the records of another cluster.

Modifications, additions, or omissions may be made to method 400 depicted in FIG. 4. Method 400 may include more, fewer, or other steps. For example, steps may be performed in parallel or in any suitable order. While discussed as intrusion assessment device 115 performing the steps, any suitable component of system 100, such as device 105 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An intrusion assessment apparatus comprising:
a memory configured to store:
    a first email that indicates a first network intrusion;
    a second email;
    a first keyword pertaining to network intrusions;
    a second keyword pertaining to network intrusions; and
    a third keyword pertaining to network intrusions; and
a processor communicatively coupled to the memory, the processor configured to:
    determine a number of occurrences of the first keyword in the first email;
    determine a number of occurrences of the first keyword in the second email;
    determine a number of occurrences of the second keyword in the first email;
    determine a number of occurrences of the second keyword in the second email;
    determine a number of occurrences of the third keyword in the first email;
    determine a number of occurrences of the third keyword in the second email;
    based on the number of occurrences of the first, second, and third keywords in the first and second emails, assign the first email to a first cluster and the second email to a second cluster;
    determine a per-record average number of occurrences of the first keyword in a plurality of emails assigned to the first cluster and in a plurality of emails assigned to the second cluster;
    determine a per-record average number of occurrences of the second keyword in the plurality of emails assigned to the first cluster and in the plurality of emails assigned to the second cluster;
    determine a per-record average number of occurrences of the third keyword in the plurality of emails assigned to the first cluster and in the plurality of emails assigned to the second cluster;
    receive a search request indicating the first, second, and third keywords and an emphasis value for each of the first, second, and third keywords, the search request pertaining to a second network intrusion;
    determine, based on the per-record average numbers of occurrences of the first, second, and third keywords in the plurality of emails assigned to the first cluster and in the plurality of emails assigned to the second cluster, that the first cluster should be returned in response to the request;
    transmit, based on the determination that the first cluster should be returned, the first email indicating the first network intrusion; and
    implement, based on the first email, a process to prevent the second network intrusion.

2. The intrusion assessment apparatus of claim 1, wherein determining that the first cluster should be returned, comprises:
    determining a difference between the emphasis value of the first keyword and the average number of occurrences of the first keyword in the plurality of emails assigned to the first cluster;
    determining a difference between the emphasis value of the first keyword and the average number of occurrences of the first keyword in the plurality of emails assigned to the second cluster;
    determining a difference between the emphasis value of the second keyword and the average number of occurrences of the second keyword in the plurality of emails assigned to the first cluster;
    determining a difference between the emphasis value of the second keyword and the average number of occurrences of the second keyword in the plurality of emails assigned to the second cluster;
    determining a difference between the emphasis value of the third keyword and the average number of occurrences of the third keyword in the plurality of emails assigned to the first cluster;
    determining a difference between the emphasis value of the third keyword and the average number of occurrences of the third keyword in the plurality of emails assigned to the second cluster;
    determining the root mean square of the determined differences for the first, second, and third keywords in the plurality of emails assigned to the first cluster;
    determining the root mean square of the determined differences for the first, second, and third keywords in the plurality of emails assigned to the second cluster;

determining that the root mean square for the first cluster is less than the root mean square for the second cluster; and in response to the determination that the root mean square of the first cluster is less than the root mean square for the second cluster, transmit the first email.

3. The intrusion assessment apparatus of claim 1, wherein a number of clusters is determined using K-Means clustering.

4. The intrusion assessment apparatus of claim 1, wherein the first keyword comprises a keyphrase.

5. The intrusion assessment apparatus of claim 1, wherein the processor is further configured to communicate an alert indicating the plurality of emails of the first cluster.

6. The intrusion assessment apparatus of claim 1, wherein the processor is further configured to determine a relevance value for the first email by determining:
   a difference between the number of occurrences in the first email of the first keyword and the determined average number of occurrences of the first keyword in the plurality of emails assigned to the first cluster;
   a difference between the number of occurrences in the first email of the second keyword and the determined average number of occurrences of the second keyword in the plurality of emails assigned to the first cluster; and
   a difference between the number of occurrences in the first email of the third keyword and the determined average number of occurrences of the third keyword in the plurality of emails assigned to the first cluster.

7. A method comprising:
   storing:
      a first email that indicates a first network intrusion;
      a second email;
      a first keyword pertaining to network intrusions;
      a second keyword pertaining to network intrusions; and
      a third keyword pertaining to network intrusions;
   determining a number of occurrences of the first keyword in the first email;
   determining a number of occurrences of the first keyword in the second email;
   determining a number of occurrences of the second keyword in the first email;
   determining a number of occurrences of the second keyword in the second email;
   determining a number of occurrences of the third keyword in the first email;
   determining a number of occurrences of the third keyword in the second email;
   based on the number of occurrences of the first, second, and third keywords in the first and second emails, assigning the first email to a first cluster and the second email to a second cluster;
   determining a per-record average number of occurrences of the first keyword in a plurality of emails assigned to the first cluster and in a plurality of emails assigned to the second cluster;
   determining a per-record average number of occurrences of the second keyword in the plurality of emails assigned to the first cluster and in the plurality of emails assigned to the second cluster;
   determining a per-record average number of occurrences of the third keyword in the plurality of emails assigned to the first cluster and in the plurality of records assigned to the second cluster;
   receiving a search request indicating the first, second, and third keywords and an emphasis value for each of the first, second, and third keywords, the search request pertaining to a second network intrusion;
   determining, based on the per-record average numbers of occurrences of the first, second, and third keywords in the plurality of emails assigned to the first cluster and in the plurality of emails assigned to the second cluster, that the first cluster should be returned in response to the request; and
   transmitting, based on the determination that the first cluster should be returned, the first email indicating the first network intrusion; and
   implementing, based on the first email, a process to prevent the second network intrusion.

8. The method of claim 7, wherein determining that the first cluster should be returned, comprises:
   determining a difference between the emphasis value of the first keyword and the average number of occurrences of the first keyword in the plurality of emails assigned to the first cluster;
   determining a difference between the emphasis value of the first keyword and the average number of occurrences of the first keyword in the plurality of emails assigned to the second cluster;
   determining a difference between the emphasis value of the second keyword and the average number of occurrences of the second keyword in the plurality of emails assigned to the first cluster;
   determining a difference between the emphasis value of the second keyword and the average number of occurrences of the second keyword in the plurality of emails assigned to the second cluster;
   determining a difference between the emphasis value of the third keyword and the average number of occurrences of the third keyword in the plurality of emails assigned to the first cluster;
   determining a difference between the emphasis value of the third keyword and the average number of occurrences of the third keyword in the plurality of emails assigned to the second cluster;
   determining the root mean square of the determined differences for the first, second, and third keywords in the plurality of emails assigned to the first cluster;
   determining the root mean square of the determined differences for the first, second, and third keywords in the plurality of emails assigned to the second cluster;
   determining that the root mean square for the first cluster is less than the root mean square for the second cluster; and
   in response to the determination that the root mean square of the first cluster is less than the root mean square for the second cluster, transmit the first email.

9. The method of claim 7, wherein a number of clusters is determined using K-Means clustering.

10. The method of claim 7, wherein the first keyword comprises a keyphrase.

11. The method of claim 7, further comprising communicating an alert indicating the plurality of emails of the first cluster.

12. The method of claim 7, further comprising determining a relevance value for the first email by determining:
   a difference between the number of occurrences in the first email of the first keyword and the determined average number of occurrences of the first keyword in the plurality of emails assigned to the first cluster;
   a difference between the number of occurrences in the first email of the second keyword and the determined average number of occurrences of the second keyword in the plurality of emails assigned to the first cluster; and
a difference between the number of occurrences in the first email of the third keyword and the determined average number of occurrences of the third keyword in the plurality of emails assigned to the first cluster.

13. One or more computer-readable non-transitory storage media embodying software that is operable when executed to:
store:
a first email that indicates a first network intrusion;
a second email;
a first keyword pertaining to network intrusions;
a second keyword pertaining to network intrusions; and
a third keyword pertaining to network intrusions;
determine a number of occurrences of the first keyword in the first email;
determine a number of occurrences of the first keyword in the second email;
determine a number of occurrences of the second keyword in the first email;
determine a number of occurrences of the second keyword in the second email;
determine a number of occurrences of the third keyword in the first email;
determine a number of occurrences of the third keyword in the second email;
based on the number of occurrences of the first, second, and third keywords in the first and second emails, assign the first email to a first cluster and the second email to a second cluster;
determine a per-record average number of occurrences of the first keyword in a plurality of emails assigned to the first cluster and in a plurality of emails assigned to the second cluster;
determine a per-record average number of occurrences of the second keyword in the plurality of emails assigned to the first cluster and in the plurality of emails assigned to the second cluster;
determine a per-record average number of occurrences of the third keyword in the plurality of emails assigned to the first cluster and in the plurality of emails assigned to the second cluster;
receive a search request indicating the first, second, and third keywords and an emphasis value for each of the first, second, and third keywords, the search request pertaining to a second network intrusion;
determine, based on the per-record average numbers of occurrences of the first, second, and third keywords in the plurality of emails assigned to the first cluster and in the plurality of emails assigned to the second cluster, that the first cluster should be returned in response to the request; and
transmit, based on the determination that the first cluster should be returned, the first email indicating the first network intrusion; and
implement, based on the first email, a process to prevent the second network intrusion.

14. The media of claim 13, wherein determining that the first cluster should be returned, comprises:
determining a difference between the emphasis value of the first keyword and the average number of occurrences of the first keyword in the plurality of emails assigned to the first cluster;
determining a difference between the emphasis value of the first keyword and the average number of occurrences of the first keyword in the plurality of emails assigned to the second cluster;
determining a difference between the emphasis value of the second keyword and the average number of occurrences of the second keyword in the plurality of emails assigned to the first cluster;
determining a difference between the emphasis value of the second keyword and the average number of occurrences of the second keyword in the plurality of emails assigned to the second cluster;
determining a difference between the emphasis value of the third keyword and the average number of occurrences of the third keyword in the plurality of emails assigned to the first cluster;
determining a difference between the emphasis value of the third keyword and the average number of occurrences of the third keyword in the plurality of emails assigned to the second cluster;
determining the root mean square of the determined differences for the first, second, and third keywords in the plurality of emails assigned to the first cluster;
determining the root mean square of the determined differences for the first, second, and third keywords in the plurality of emails assigned to the second cluster;
determining that the root mean square for the first cluster is less than the root mean square for the second cluster; and
in response to the determination that the root mean square of the first cluster is less than the root mean square for the second cluster, transmit the first email.

15. The media of claim 13, wherein a number of clusters is determined using K-Means clustering.

16. The media of claim 13, wherein the first keyword comprises a keyphrase.

17. The media of claim 13, wherein the software is further operable when executed to communicate an alert indicating the plurality of emails of the first cluster.

18. The media of claim 13, wherein the software is further operable when executed to determine a relevance value for the first email by determining:
a difference between the number of occurrences in the first email of the first keyword and the determined average number of occurrences of the first keyword in the plurality of emails assigned to the first cluster;
a difference between the number of occurrences in the first email of the second keyword and the determined average number of occurrences of the second keyword in the plurality of emails assigned to the first cluster; and
a difference between the number of occurrences in the first email of the third keyword and the determined average number of occurrences of the third keyword in the plurality of emails assigned to the first cluster.

* * * * *